US012774928B2

(12) United States Patent
Scherer et al.

(10) Patent No.: US 12,774,928 B2
(45) Date of Patent: Oct. 27, 2026

(54) SYSTEMS AND METHODS FOR MONITORING THE SURFACE TEMPERATURE OF AN OBJECT USING THE TEMPERATURE-DEPENDENT ABSORPTION PROPERTIES OF SEMICONDUCTORS

(71) Applicants: California Institute of Technology, Pasadena, CA (US); TotalEnergies OneTech, Courbevoie (FR)

(72) Inventors: Axel Scherer, Barnard, VT (US); Jack Jewell, Boulder, CO (US); John Richard Ordonez-Varela, Lescar (FR); Paromita Mitchell, Pasadena, CA (US)

(73) Assignees: CALIFORNIA INSTITUTE OF TECHNOLOGY, Pasadena, CA (US); TOTALENERGIES ONETECH, Courbevoie (FR)

( * ) Notice: Subject to any disclaimer, the term of this patent is extended or adjusted under 35 U.S.C. 154(b) by 290 days.

(21) Appl. No.: 18/376,582

(22) Filed: Oct. 4, 2023

(65) Prior Publication Data

US 2024/0110837 A1 Apr. 4, 2024

Related U.S. Application Data

(60) Provisional application No. 63/414,225, filed on Oct. 7, 2022, provisional application No. 63/413,100, filed on Oct. 4, 2022.

(51) Int. Cl.
*G01K 11/125* (2021.01)

(52) U.S. Cl.
CPC .................................. *G01K 11/125* (2013.01)

(58) Field of Classification Search
CPC ............................ G01K 11/125; G01K 13/08
(Continued)

(56) References Cited

U.S. PATENT DOCUMENTS 5,388,909 A * 2/1995 Johnson ................. G01K 11/14 374/161
5,727,017 A 3/1998 Maurer et al.
(Continued)

FOREIGN PATENT DOCUMENTS

EP 2372752 1/2017
JP 2007-271399 10/2007
WO WO-2016094827 A1 * 6/2016 ............. B33Y 30/00

OTHER PUBLICATIONS

International Search Report & Written Opinion issued in PCT Patent Application No. PCT/US2024/028975 on Sep. 25, 2024.
(Continued)

*Primary Examiner* — Peter J Macchiarolo
*Assistant Examiner* — Mireille S Sadate-Moualeu
(74) *Attorney, Agent, or Firm* — Kaplan Breyer Schwarz, LLP

(57) ABSTRACT

A temperature monitoring system includes a semiconductor member mounted onto the surface of an object having a surface whose temperature is to be monitored. The semiconductor member has a temperature-dependent bandgap with an absorption edge that varies with temperature. A light source is configured to illuminate the semiconductor member with monochromatic light. The monochromatic light has a wavelength equal to an absorption edge wavelength that is associated with the absorption edge when the semiconductor member is at a specified temperature. A detector is configured to receive light reflected from the semiconductor member when illuminated with the monochromatic light such that a surface temperature of the object is at the specified temperature when a change in an amount of reflected light that is received indicates that the wavelength of the monochromatic light is equal to the absorption edge wavelength at the specified temperature.

27 Claims, 3 Drawing Sheets

(58) Field of Classification Search
USPC ........................................................ 374/161
See application file for complete search history.

(56) References Cited

U.S. PATENT DOCUMENTS

| | | | | |
|---|---|---|---|---|
| 2003/0161380 | A1 | 8/2003 | Hauenstein | |
| 2005/0036151 | A1 | 2/2005 | Gornick et al. | |
| 2005/0063451 | A1 | 3/2005 | Abe et al. | |
| 2005/0106876 | A1* | 5/2005 | Taylor, II | G01J 5/60 438/689 |
| 2010/0274523 | A1 | 10/2010 | Taylor, II et al. | |
| 2012/0118224 | A1* | 5/2012 | Bour | C30B 25/16 118/712 |
| 2012/0133934 | A1 | 5/2012 | Barlett et al. | |
| 2012/0231558 | A1 | 9/2012 | Timans | |
| 2018/0306650 | A1* | 10/2018 | Garcia de Gorordo | G01K 11/20 |

OTHER PUBLICATIONS

International Search Report and Written Opinion issued in PCT Application No. PCT/US2023/034442, Mar. 5, 2024, 8 pp.
Notice of Allowance and Fees Due (PTOL-85) Mailed on Jan. 27, 2026 for U.S. Appl. No. 18/661,379, 15 page(s).
Extended European Search Report received in EP Patent Application No. 23875470.9 on Aug. 13, 2026.

* cited by examiner

SYSTEMS AND METHODS FOR MONITORING THE SURFACE TEMPERATURE OF AN OBJECT USING THE TEMPERATURE-DEPENDENT ABSORPTION PROPERTIES OF SEMICONDUCTORS

CROSS-REFERENCE TO RELATED APPLICATION

This application claims the benefit of U.S. Provisional Application Ser. No. 63/413,100, filed Oct. 4, 2022, and U.S. Provisional Application Ser. No. 63/414,225, filed Oct. 7, 2022, both entitled "OPTICAL FIBER THERMOMETER FOR PROXIMITY TEMPERATURE TESTING", the contents of which are incorporated herein by reference.

BACKGROUND

The convenient measurement of temperature typically involves the use of thermocouple sensors, measurement of black body radiation, or the measurement of the thermal expansion of liquids. More recently, optical measurements of fluorescence from either polymer fluorophores or from rare earth atoms have emerged as a promising method for the local measurement of temperature. Such temperature-dependent luminescence techniques typically determine the ratio of two fluorescent peaks, and this ratio in turn provides the temperature. Alternatively, the time delay between the optical pumping of the fluorophore and the onset of fluorescence can also provide the temperature as this is a direct measurement of the relaxation time of the excited state of the excited atom or molecule. All of these techniques, however, require either physical contact with the object whose temperature is being determined, are limited in their temperature range or sensitivity, or require complex instrumentation to complete a measurement.

Another temperature monitoring technique, often referred to as band edge thermometry, uses the temperature dependence of a semiconductor's band gap to measure temperatures. With this technique, the sample either diffusely reflects or transmits light in the appropriate wavelength range. The energy of the transition from absorbing to transmitting defines the optical absorption edge of the sample and is temperature dependent. A spectrometer is used to analyze the spectrum of the diffusely reflected or transmitted light to determine the wavelength of the absorption edge, which it converts to temperature using material-specific calibration curves. Some band edge thermometry systems bond the semiconductor to the end of the optical fiber that returns the reflected light to fiber-coupled spectrometer. These systems require an expensive spectrometer and also require physical contact between the end of the optical fiber on which the semiconductor is located and the object whose temperature is being monitored.

SUMMARY

In one aspect, described herein are temperature monitoring systems and methods that use the temperature dependent absorption properties of a material such as a semiconductor to monitor the temperature of an object's surface. Unlike the conventional techniques discussed above, the systems and methods described herein are advantageously non-contact techniques that may employ relatively inexpensive and readily available components such as light sources and detectors.

In one particular embodiment, a temperature monitoring system includes a semiconductor member mounted onto the surface of an object having a surface whose temperature is to be monitored. The semiconductor member has a temperature-dependent bandgap with an absorption edge that varies with temperature. A light source is configured to illuminate the semiconductor member with monochromatic light. The monochromatic light has a wavelength equal to an absorption edge wavelength that is associated with the absorption edge when the semiconductor member is at a specified temperature. A detector is configured to receive light reflected from the semiconductor member when illuminated with the monochromatic light such that a surface temperature of the object is at the specified temperature when a change in an amount of reflected light that is received indicates that the wavelength of the monochromatic light is equal to the absorption edge wavelength at the specified temperature.

In some embodiments the temperature monitoring system operates in free space. That is, the light directed from the light source to the semiconductor member and the reflected light received by the detector from the semiconductor travel through free space. In other embodiments the light directed from the light source to the semiconductor member and the reflected light received by the detector from the semiconductor travel through optical fibers or even planar integrated waveguides.

In some embodiments the light source is a laser such as a vertical-cavity surface-emitting laser (VCSEL) or the light source may be a broadband light source having a filter to produce monochromatic light. The light source may operate at a fixed wavelength or it may be tunable, which can allow the actual temperature of the object to be determined. Regarding the detector, any suitable type may be employed such as a photodetector or a photodetector array.

The object whose surface temperature is being monitored may be fixed in place. In some cases, however, the object may be moving while the temperature is being monitored. For example, the object may be a rotating object (e.g., the rotor of a motor). In these cases the detector can be synchronized to the rotational speed of the rotating object by distinguishing between the amount of reflected light received from the surface of the rotating object 315 and the semiconductor member or members. In this way it can be determined when the detector is receiving reflected light from the semiconductor member(s), which represents the desired signal that allows the surface temperature of the rotating object to be monitored. In addition to monitoring temperature, this technique advantageously may also allow other mechanical information about the rotating object to be determined such as its rotational speed. Moreover, if fiducial markers are provided on the object which allow them to be detected from the contrast in the amount of reflected light they provide to the detector relative to the amount of reflected light received by the detector from the surface material of the rotating object and the semiconductor member, other mechanical information can be obtained such as the eccentricity, vibration and elastic deflection of the object.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWING

FIG. 4(*b*) is a schematic illustration of a rotating object whose temperature is to be monitored in which the distal end of an optical fiber provides illumination to a central location on the semiconductor member.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Figure 1:
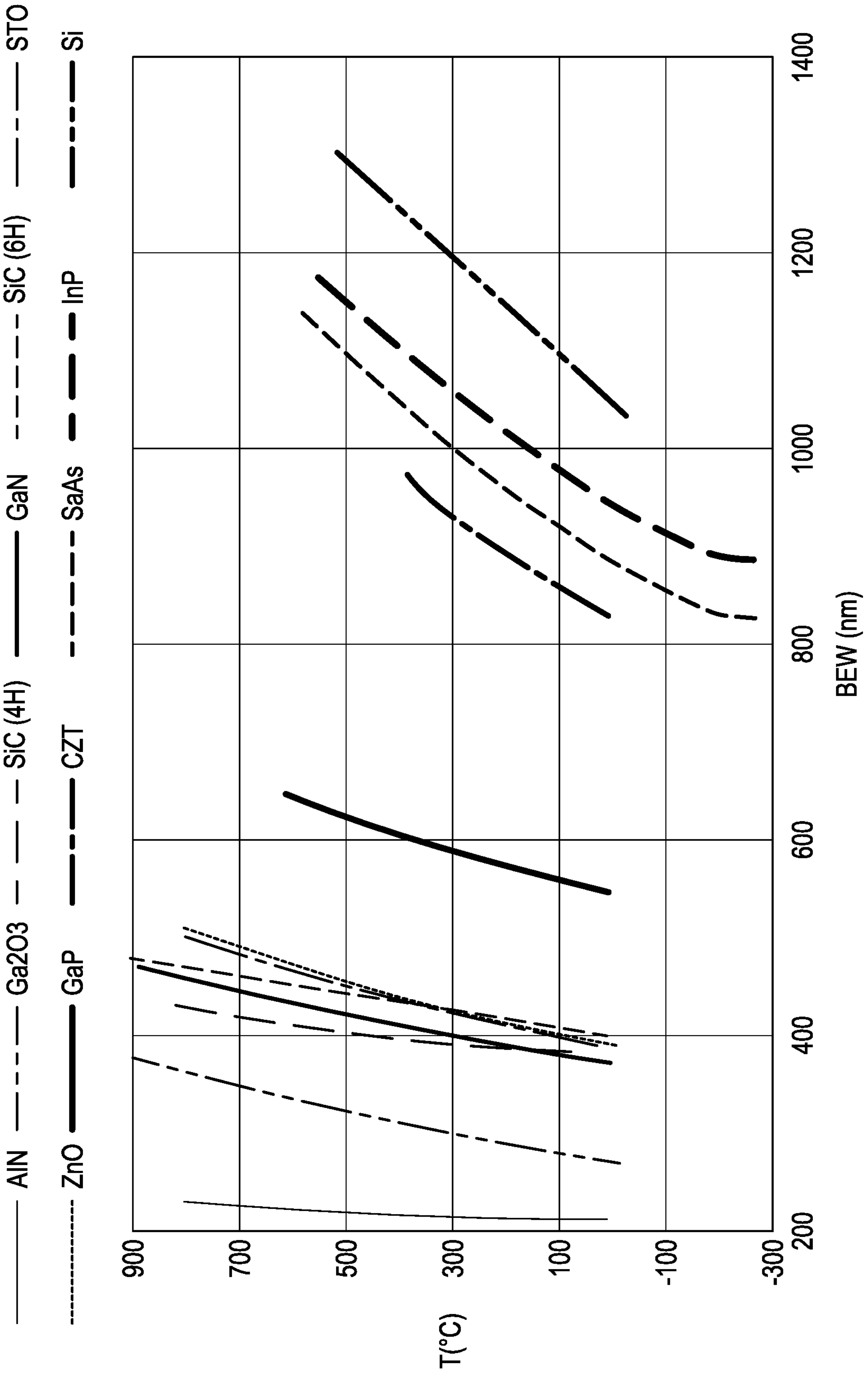
FIG. 1 shows the temperature dependence of the absorption edge wavelength for a number of common semiconductors.

In one aspect, described herein are temperature monitoring systems and methods that use the temperature dependent absorption properties of semiconductors to monitor the temperature of a sample surface. Such methods are sometimes referred to as band edge thermometry. Since semiconductor materials have a bandgap that generally decreases with temperature, the wavelength at which the semiconductor begins to absorb energy, referred to as the absorption edge wavelength, also varies with temperature and provides a direct measurement of temperature. FIG. 1 shows the temperature dependence of the absorption edge wavelength for a number of common semiconductors. In the case of a GaAs semiconductor, for example, the absorption edge wavelength is about 880 nm (bandgap energy 1.466 eV) at room temperature and changes by about 0.4 nm/C.

It should be noted that the systems and methods described herein are generally applicable to any material whose optical reflectance, absorptance, or transmittance, or any combination thereof, changes with temperature. Such other materials may include, for example, insulators, suspensions, liquid crystals and so on. Semiconductors are advantageous due to their ability to withstand high temperatures (100's of degrees Celsius), and because of their high availability.

In one embodiment of the temperature monitoring systems and methods described herein, a measurement of a threshold temperature may be performed by illuminating a semiconductor material with monochromatic light having a wavelength corresponding to the location of the band edge at the desired threshold temperature. At this temperature the selected wavelength starts to absorb the light. That is, at the selected threshold temperature the wavelength of the monochromatic light is chosen to match the absorption edge wavelength of the selected semiconductor and there is a large change in the amount of light that will be detected.

Figure 2:
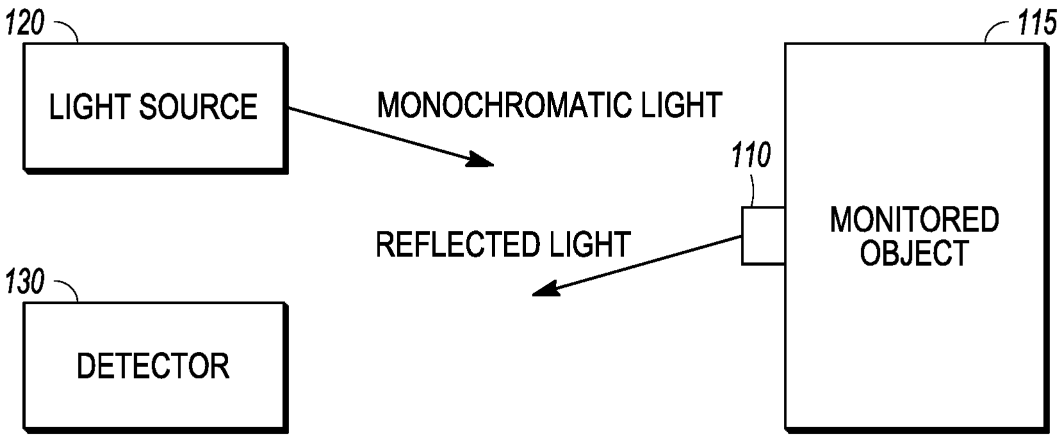
FIG. 2 shows a schematic block diagram illustrating the operating principles of one example of the temperature monitoring systems described herein that may be used to perform threshold temperature detection.

FIG. 2 shows a schematic diagram illustrating the operating principles of one example of the temperature monitoring systems described herein that may be used to perform threshold temperature detection. As shown, a semiconductor member 110 is mounted on the surface of an object 115 whose temperature is to be monitored. A light source 120 directs monochromatic light on the semiconductor member 110 and a detector 130 detects the reflected light received from the semiconductor member 110. The temperature of the semiconductor member 110, and hence the temperature of the surface of the object 115, can be determined by measuring the change in the amount of reflected light received from the semiconductor member 110. If the semiconductor absorbs the light, the temperature of the semiconductor, and hence the surface temperature of the sample 115, is above a threshold temperature. Conversely, if the semiconductor becomes transparent to the light, the temperature of the semiconductor is below the threshold temperature. This transition between the absorptive and transmissive states of the semiconductor can be measured by the detector 130.

The semiconductor member 110 may be a semiconductor wafer, chip or the like that is mounted to the object 115. The particular semiconductor that is chosen may be any semiconductor that has a conveniently measured absorption edge wavelength that varies over a desired temperature range that includes the threshold temperature to be monitored. While the particular semiconductor that is chosen may be a direct band gap or an indirect band gap material, a direct band gap material generally may be preferred because it provides a sharper absorption edge and therefore a potentially more accurate measure of the threshold temperature. In some embodiments the light-receiving surface of the semiconductor member 110 may be provided with an anti-reflective coating to reduce specular reflections from the side facing the light source and thereby increase the signal-to-noise ratio of the temperature monitoring system.

The monochromatic light may be provided by any light source 120 that can produce light at a wavelength that corresponds to the absorption edge wavelength of the selected semiconductor member 110 at the chosen threshold temperature. Examples of suitable light sources may include, for instance, lasers of any known type such as solid state or semiconductor lasers, including laser diodes and fiber lasers. In some embodiments inexpensive commercially available laser packages may be employed of the type often used, for instance, in Light Detection and Ranging (LIDAR) applications. Lasers such as vertical cavity lasers are readily available which have output wavelengths from 650 nm to 1500 nm. In addition to selecting an appropriate laser source based on the absorption edge wavelength that is needed, the selection may also take into account the temperature accuracy that is desired, which depends in part on the spectral width of the light source. For instance, most diode lasers have spectral widths that are able to provide a threshold temperature measurement that is accurate to within better than 1 C. Alternatively, the light source 120 may be a relatively broadband light source such as a light emitting diode (LED), assuming a suitable filter is employed to filter the broadband light to provide the monochromic light at the desired wavelength. In some embodiments the light source 120 provides a narrow-linewidth signal having a full-width-at half-maximum (FWHM) of 10 nm or less; however, in other embodiments, a light source having a wider emission spectrum can be used.

The detector 130 that is employed may be any type that can detect the reflected light from the semiconductor member 110 such as a photodetector, photodetector array, focal-plane array, or an imaging system, for example.

A specific illustrative example of a system that employs commonly available direct bandgap semiconductor materials that are matched with inexpensive, off-the-shelf light sources, may use, for example, either GaAs or InP as the semiconductor member whose temperature is monitored. GaAs and InP have room temperature absorption edge wavelengths of about 880 nm and 963 nm, respectively. In the case of GaAs, the absorption edge wavelength is about 940 nm at a temperature of 175 C. A laser source that may be well-matched to for monitoring this temperature is a InGaAs vertical-cavity surface-emitting laser, (VCSEL) operating at room temperature. Likewise, if InP is chosen as the semiconductor to be monitored, the absorption edge wavelength is about 1060 nm at about 275 C. A laser source that may be well-matched for monitoring this temperature is a 1060 nm ND-based laser or VCSEL.

It should be noted that the semiconductor member should provide a sufficient “change” to the reflected light received by the detector due to the change in the state of the semiconductor member from transmissive to absorptive. In the transmissive state, the semiconductor member, with the antireflection coating, would reflect negligibly from the top surface, and the light would transmit to the bottom surface, where it may reflect from the bottom surface and/or the monitored object. This reflection from the bottom surface would likely have poorer coupling back to the detector than the coupling that arises from reflection from the top surface (which is relatively low). As a consequence, the detector would receive a low signal when the reflection is from the bottom surface. On the other hand, when the semiconductor becomes absorptive, the reflection from the top surface of the semiconductor member would increase, with the bottom surface reflection being largely irrelevant since the light is absorbed. Accordingly, the change in the amount of light that is received by the detector would be enhanced if reflection from the back surface of the semiconductor member is either minimized or maximized. If there is minimal back surface reflection, (e.g., by providing the semiconductor member with a roughened back surface, which is common for semiconductor substrates) then the detector signal will transition from a lower to a higher level when the semiconductor absorption transitions from low-to-high. Alternatively, if a highly reflective surface is located on the back of the semiconductor member, (e.g. using a metal coating on a polished surface), the detector will receive a relatively high signal when the semiconductor member is transmissive, and a relatively low signal when the semiconductor is absorptive.

In addition to the semiconductors mentioned above, other illustrative semiconductors that may be employed include elemental semiconductors such as Si, Ge and combinations thereof, as well as compound semiconductor such as group III elements and group 5 elements (often referred to as III-V semiconductors) such as GaAs, AlAs, InP, InSb, GaN, GaSb and combinations thereof such as AlGaAs, InGaP, InGaN, InGaP, as well as more complex mixtures such as InGaAsP, InGaAlP, InGaAsN.

In some embodiments the temperature monitoring systems described herein may operate in free space. Other embodiments may employ optical fibers to deliver the monochromatic light from the light source to the semiconductor material and to direct the reflected light from the semiconductor member to the detector. One example of an optical fiber-based arrangement is shown in FIG. 3.

Figure 3:
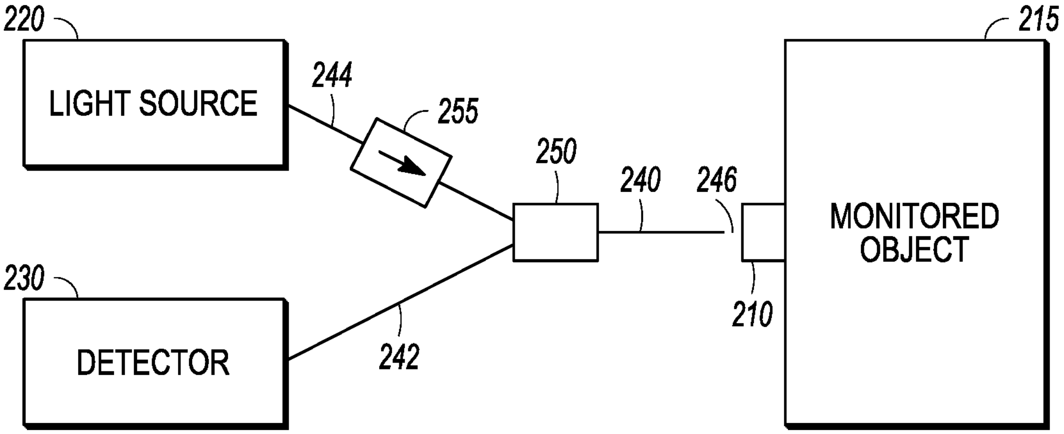
FIG. 3 shows a schematic block diagram illustrating an example of the temperature monitoring system in which the monochromatic light provided to the semiconductor member and the reflected light provided to the detector are guided over optical fibers.
Figure 4A:
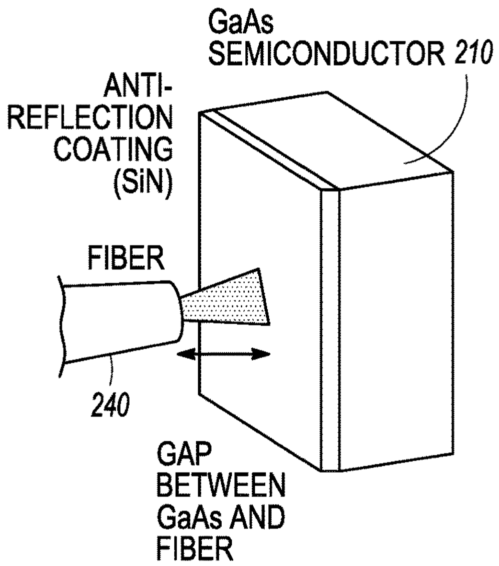
FIG. 4(*a*) is a schematic illustration of a semiconductor member (e.g., GaAs) and the distal end of an optical fiber providing illumination to a central location on the semiconductor member.
Figure 4B:
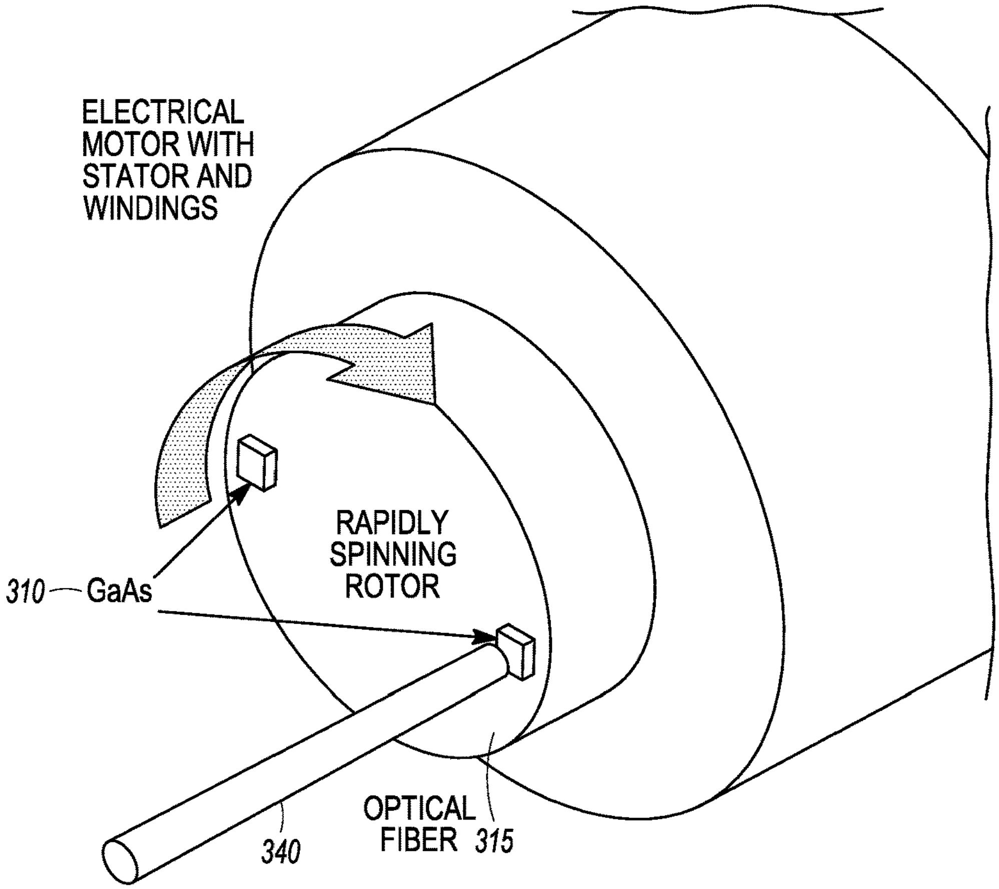

The optical fiber-based arrangement shown in FIG. 3 includes a light source 220 for illuminating a semiconductor member 210 mounted on the surface of the object 210 whose surface temperature is to be measured and a detector 230 for receiving light reflected from the semiconductor member 210. Light source 220 and detector 230 may be similar to those described above in connection with FIG. 2. An optical fiber 244 receives the monochromatic light provided by the light source 220 and directs it through a 1×2 optical splitter 250 into an optical fiber 240. The distal end of the optical fiber 240 is located in proximity to the semiconductor member 210 so that there is a small gap 246 between them. The light exits the optical fiber 240 and is directed over the gap 246 and onto the semiconductor member 210. The reflected light from the semiconductor member 210 is received by the distal end of the optical fiber 240 and guided back through the optical splitter 250 into the optical fiber 242 and is received by the detector 230. An optical isolator 244 is located along the optical path between light source 220 and the optical splitter 250 to prevent reflected light from being directed onto the light source 220. The optical fibers 244, 242 and 240 may be of any type that is suitable for transmitting the light from the light source 220 and providing the reflected light to the detector 230. Such optical fibers may be single mode or multimode optical fibers. FIG. 4(*a*) is a schematic illustration of the semiconductor member 210 (e.g., GaAs) and the distal end of the optical fiber 240 providing illumination to a central location on the semiconductor member 210. As shown, the optical fiber 240 does not contact the semiconductor member 210 but is spaced apart from it by a small gap.

While some embodiments of the temperature monitoring system described herein may employ a single monochromatic light source, in some alternative embodiments multiple light sources may be used to provide light at a plurality of different wavelengths that are each able to monitor a different threshold temperature. In this way it may be determined when the temperature of the object exceeds a plurality of different thresholds.

In yet other embodiments the light source may be a tunable light source such as a tunable laser that can be tuned over a range of wavelengths at which the band edge may be located when the temperature of the semiconductor member varies over a desired range of temperatures. The use of such a tunable light source may allow the temperature monitoring system to continuously monitor the actual temperature of the object surface instead of simply monitoring one or more threshold temperatures. Some examples of tunable light sources have their output wavelength tuned by changing the laser temperature using, for example, an electric heater or a thermoelectric cooling system. In some cases, a wavelength tuning range of 80 nm can enable a temperature within a range of about 150-200 C to be measured.

In some cases, the object whose surface temperature is being monitored (e.g., object 115 in FIG. 2 and object 215 in FIG. 3) may be fixed in place. In other cases, however the object may be moving while its temperature is being monitored. For instance, FIG. 4(*b*) is a schematic illustration of a rotating object 315 whose surface temperature is being monitored. One example of a rotating object 315 whose temperature may be monitored is the rotor of a motor. As shown, one or more semiconductor members 310 may be mounted on the rotor at locations that allow each of them to be illuminated by the distal end of a fiber 340 during one rotation of the rotating object 315. If more than one semiconductor member 310 is employed such as shown in FIG. 4(*b*), this will generally require the semiconductor members 310 to be located at a common radius from the center of the rotating object 315. In the example shown in FIG. 4(*b*) two semiconductors of GaAs are shown on the surface of rotating object 315. The detector can be synchronized to the rotational speed of the rotating object 315 by distinguishing between the amount of reflected light received from the surface of the rotating object 315 and the semiconductor members 310. In this way it can be determined when the detector is receiving reflected light from the semiconductor members 310, which represents the desired signal that allows the surface temperature of the rotating object 315 to be monitored. In addition to monitoring temperature, this technique also allows the rotational speed of the rotating object to be directly determined from the rate at which the reflected light is received from the semiconductor members 310.

In the case where the rotating object is the rotor of a motor, the ability to determine when the surface temperature of the rotating object exceeds a threshold temperature can be advantageous because it can serve to indicate when the rotating object is overheating. For instance, if the rotating object is the rotor of a permanent magnet motor, high operating temperatures can cause the magnets in the rotor to lose their magnetic properties. Permanent magnets, once demagnetized, cannot recover, even if the temperature is reduced to a normal operating level. For instance, in commonly employed motors, the threshold temperature at which the rotor should operate is about 150 C to prevent the magnets from reaching demagnetization temperatures of about 180 C.

In addition to determining the rotational speed of a rotating object, in some embodiments the temperature monitoring system described herein may be used to obtain additional mechanical information about the rotating object. For example, one or more fiducial markers may be located on the surface of the rotating object. These markers need not consist of a semiconductor material, but may be formed from any materials that allow them to be distinguished by the contrast in the amount of reflected light they provide to the detector relative to the amount of reflected light received by the detector from the surface material of the rotating object and the semiconductor material that is used to monitor temperature of the rotating object. In some cases, the fiducial markers may be machined directly into the surface material of the rotating object (e.g., a metal in the case of a rotating rotor of a motor). In other embodiments, the fiducial markers may be formed in a wide variety of different ways, including, for instance, by printing or painting them onto the surface of the rotating object.

The fiducial markers that are provided may be arranged in a pattern that allows the mechanical position of the rotating object to be determined, from which various types of mechanical information about the rotating object may be determined. For instance, by measuring the amount of light reflected from the fiducial markers, mechanical information such as the eccentricity, rotational speed, vibration and/or elastic deflection of the rotating object may be determined. The fiducial marker patterns that are employed may differ, for example, in the number of markers used and their individual sizes and shapes as well as their overall complexity, any or all of which may be selected to optimize the spatial resolution of the mechanical information that is to be obtained.

The temperature monitoring systems and methods described herein provide a number of advantages over conventional temperature monitoring systems. For example, unlike thermal imaging techniques, the systems and techniques described herein are able to monitor the temperature through glass or water, which absorb at infrared wavelengths. In addition, the systems and techniques described herein provide a rapid temperature response with high resolution, do not require physical contact with the object being monitored, are able to measure the temperature of rapidly rotating objects and are largely immune to electromagnetic noise.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A temperature monitoring system, comprising:

an object having a surface whose temperature is to be monitored;

a semiconductor member mounted onto the surface of the object, the semiconductor member having a temperature-dependent bandgap with an absorption edge that varies with temperature;

a light source configured to illuminate the semiconductor member with monochromatic light having a wavelength equal to an absorption edge wavelength that is associated with the absorption edge when the semiconductor member is at a specified temperature; and a detector configured to receive light reflected from the semiconductor member when illuminated with the monochromatic light such that a surface temperature of the object is at the specified temperature when a change in an amount of reflected light that is received indicates that the wavelength of the monochromatic light is equal to the absorption edge wavelength at the specified temperature.

2. The temperature monitoring system of claim 1, wherein the monochromatic light is provided by the light source to the semiconductor member over free space.

3. The temperature monitoring system of claim 2, wherein the reflected light is received by the detector from the semiconductor member over free space.

4. The temperature monitoring system of claim 1, wherein the monochromatic light is provided by the light source to the semiconductor member over a first optical fiber having a distal end from which the monochromatic light is emitted, the distal end of the optical fiber being spaced apart from the semiconductor member by a gap over which the monochromatic light travels to illuminate the semiconductor member.

5. The temperature monitoring system of claim 4, wherein the reflected light is received by the detector from the semiconductor member over a second optical fiber.

6. The temperature monitoring system of claim 5, wherein the first and second optical fibers include a common optical fiber.

7. The temperature monitoring system of claim 1, wherein the light source is a tunable light source configured to illuminate the semiconductor member with monochromatic light that is tunable over a range of wavelengths that encompasses the wavelength that is equal to the absorption edge wavelength that is associated with the absorption edge of the semiconductor member when the semiconductor member is at the specified temperature.

8. The temperature monitoring system of claim 1, wherein the object whose surface temperature is to be monitored is a rotating object and the semiconductor member is mounted at a radial distance from an axis of rotation such that it is illuminated by the monochromatic light at one time during a rotation of the rotating object.

9. The temperature monitoring system of claim 8, wherein the semiconductor member comprises a plurality of semiconductor members that are each mounted at a common radial distance from the axis of rotation.

10. The temperature monitoring system of claim 8, further comprising at least one fiducial marker located on the rotating object such that reflected light received from the at least one fiducial marker allows mechanical information concerning the rotating object to be determined.

11. The temperature monitoring system of claim 1, wherein the semiconductor member is a direct bandgap semiconductor.

12. The temperature monitoring system of claim 1, wherein the light source is a laser.

13. The temperature monitoring system of claim 1, wherein the detector is a photodetector.

14. The temperature monitoring system of claim 1, wherein the detector is a photodetector array.

15. The temperature monitoring system of claim 1, wherein the semiconductor member is GaAs or InP.

16. The temperature monitoring system of claim 1, wherein the semiconductor member is selected from the group consisting of GaAs, AlAs, InP, InSb, GaN, GaSb.

17. The temperature monitoring system of claim 1, wherein the semiconductor member is selected from the group consisting of AlGaAs, InGaP, InGaN, InGaP.

18. A method for monitoring a surface temperature of an object, comprising: illuminating a semiconductor member mounted onto the surface of the object with monochromatic light, the semiconductor member having a temperature-dependent bandgap with an absorption edge that varies with temperature, the monochromatic light having a wavelength equal to an absorption edge wavelength that is associated with the absorption edge when the semiconductor member is at a specified temperature; and receiving light reflected from the semiconductor member when illuminated with the monochromatic light such that a surface temperature of the object is at the specified temperature when a change in an amount of reflected light that is received indicates that the wavelength of the monochromatic light is equal to the absorption edge wavelength at the specified temperature.

19. The method of claim 18, further comprising providing the monochromatic light to the semiconductor member from the light source over free space.

20. The method of claim 19, further comprising receiving the reflected light from the semiconductor member over free space.

21. The method of claim 18, further comprising providing the monochromatic light to the semiconductor member from the light source over a first optical fiber having a distal end from which the monochromatic light is emitted, the distal end of the optical fiber being spaced apart from the semiconductor member by a gap over which the monochromatic light travels to illuminate the semiconductor member.

22. The method of claim 21, further comprising receiving the reflected light from the semiconductor member over a second optical fiber.

23. The method of claim 22, wherein the first and second optical fibers include a common optical fiber.

24. The method of claim 18, wherein the light source is a tunable light source configured to illuminate the semiconductor member with monochromatic light that is tunable over a range of wavelengths that encompasses the wavelength that is equal to the absorption edge wavelength that is associated with the absorption edge of the semiconductor member when the semiconductor member is at the specified temperature.

25. The method of claim 18, wherein the object whose surface temperature is to be monitored is a rotating object and the semiconductor member is mounted at a radial distance from an axis of rotation such that it is illuminated by the monochromatic light at one time during a rotation of the rotating object.

26. The method of claim 25, wherein the semiconductor member comprises a plurality of semiconductor members that are each mounted at a common radial distance from the axis of rotation.

27. The method of claim 25, further comprising receiving reflected light from at least one fiducial marker located on the rotating object such that the reflected light received from the at least one fiducial marker allows mechanical information concerning the rotating object to be determined.

* * * * *